March 18, 1924.

R. B. WASSON

RING NOTCHING MACHINE

Filed Aug. 13, 1921

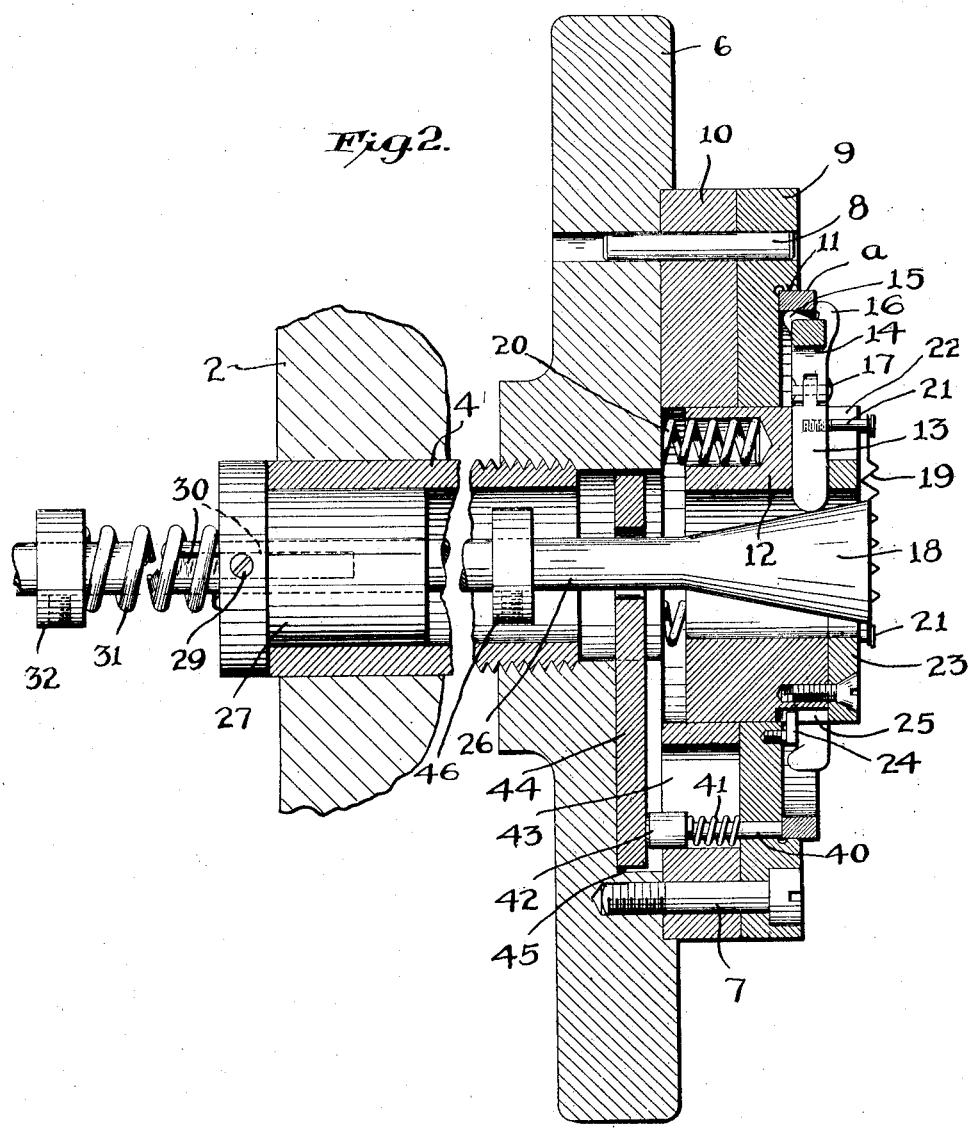

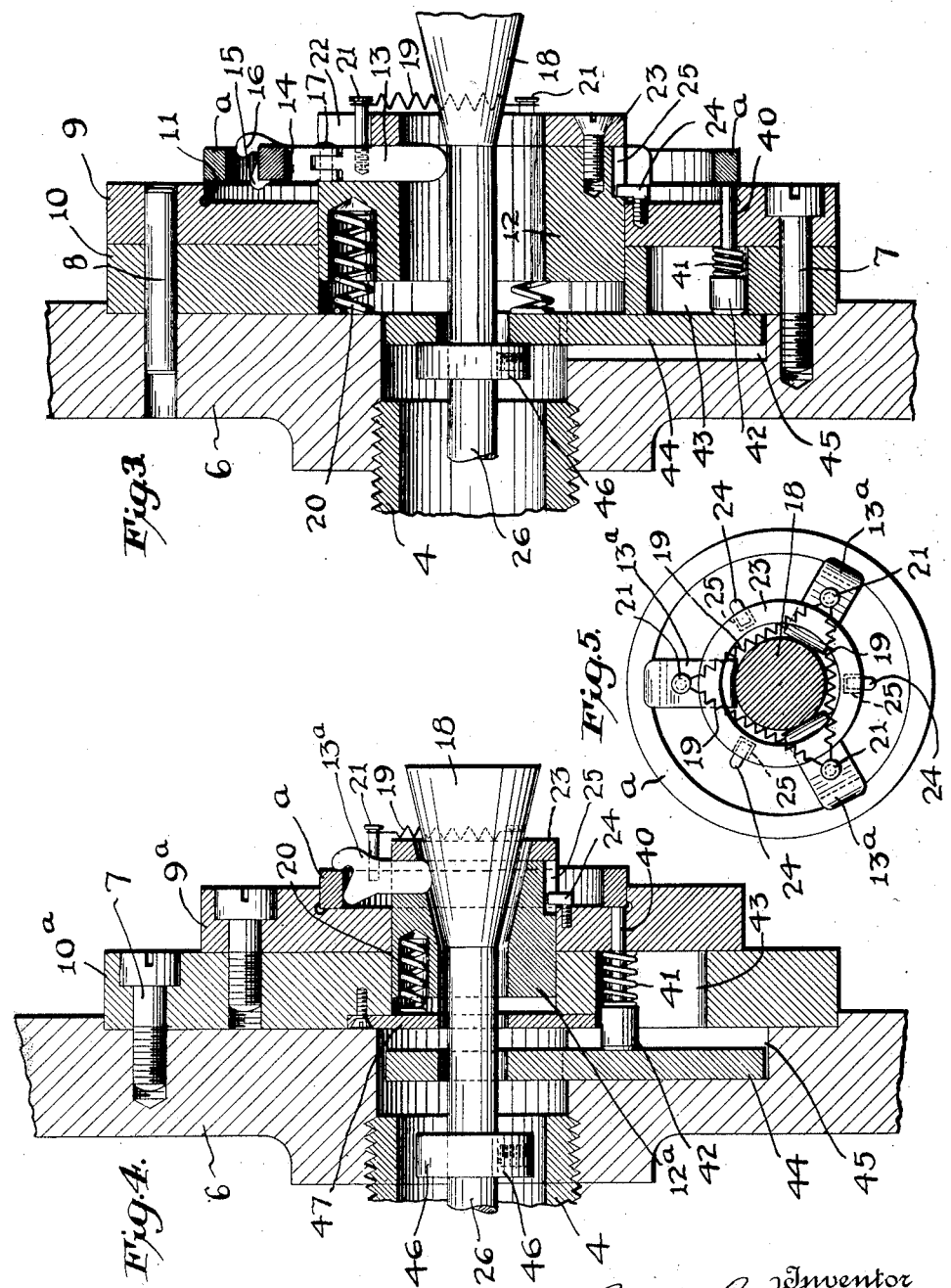

March 18, 1924.

R. B. WASSON

RING NOTCHING MACHINE

Filed Aug. 13, 1921

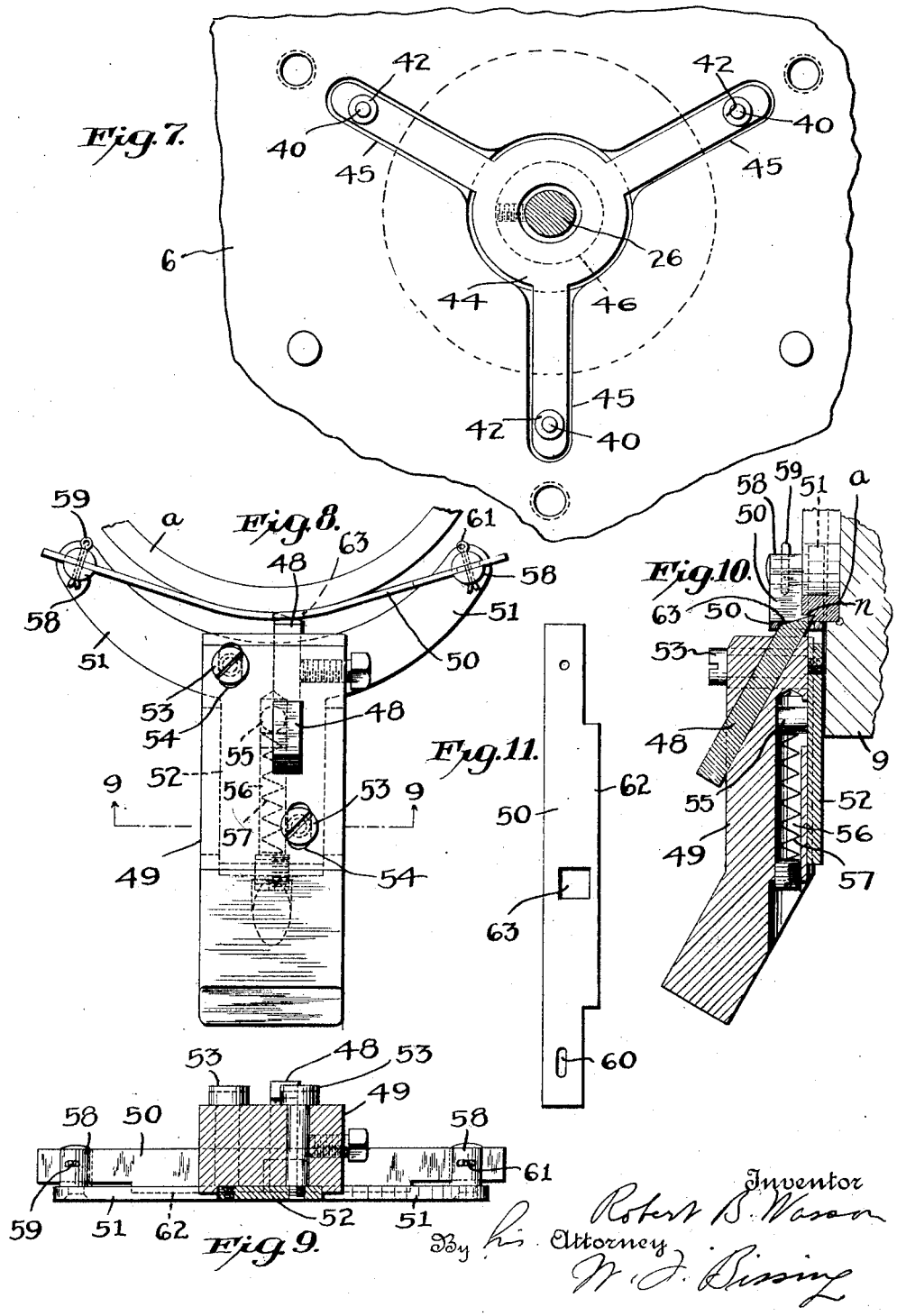

Patented Mar. 18, 1924.

1,487,411

UNITED STATES PATENT OFFICE.

ROBERT B. WASSON, OF CRANFORD, NEW JERSEY.

RING-NOTCHING MACHINE.

Application filed August 13, 1921. Serial No. 492,014.

*To all whom it may concern:*

Be it known that I, ROBERT BINGHAM WASSON, a citizen of the United States, residing at 306 Elizabeth Avenue, Cranford, New Jersey, have invented new and useful Improvements in Ring-Notching Machines, of which the following is a specification.

The invention relates to a method and means for cutting circumferential notches in piston rings. A particular object is to provide simple, effective and long-wearing means in connection with the cutter, for preserving and finishing the peripheral edge of the groove or notch, the same device being capable of cooperating with rings of various sizes.

Another object is to provide a method and means for flexibly supporting the metal adjacent to the notch against the pressure of the cutting tool, thus holding the edge of the notch against breaking and preventing the formation of any burr and burnishing the surface.

The invention may accordingly be said to comprise the novel machine and the parts, improvements and combinations herein illustrated in preferred embodiment, and more particularly set forth in the appended claims, whereby the stated objects are attained, and other advantages secured, as will become apparent to those skilled in the art.

In the accompanying drawings forming a part hereof:

Figure 1 is a plan view of a machine embodying the invention.

Fig. 2 is a horizontal section on a larger scale, of the means for supplying, holding, rotating and ejecting the rings, taken in the plane of the axis of rotation, with all the intermediate part of the spindle and adjacent parts broken out, and the rear end of the jaw-operating rod broken away, because of the limits of space, the view illustrating the clamping condition and showing a ring in place.

Fig. 3 is a more fragmentary view of the same, illustrating the parts in the open or ejecting conditions;

Fig. 4 is a similar view showing the holding means adapted for a ring of small size, the parts being shown in the clamping condition;

Fig. 5 is a sectional front elevation of Fig. 4, parts outside the circumference of the ring being omitted;

Fig. 6 is a front elevation of Fig. 2;

Fig. 7 is a fragmentary front elevation of the rotary head plate, with the ejector spider therein, and the operating rod in section;

Fig. 8 is a front elevation of the toolholder, with the tool, and blade and bladeholder, a portion of the ring being represented;

Fig. 9 is a cross-section on the line 9—9 of Fig. 8;

Fig. 10 is a longitudinal section through Fig. 8; and

Fig. 11 is a face view of the blade.

Figure 1:
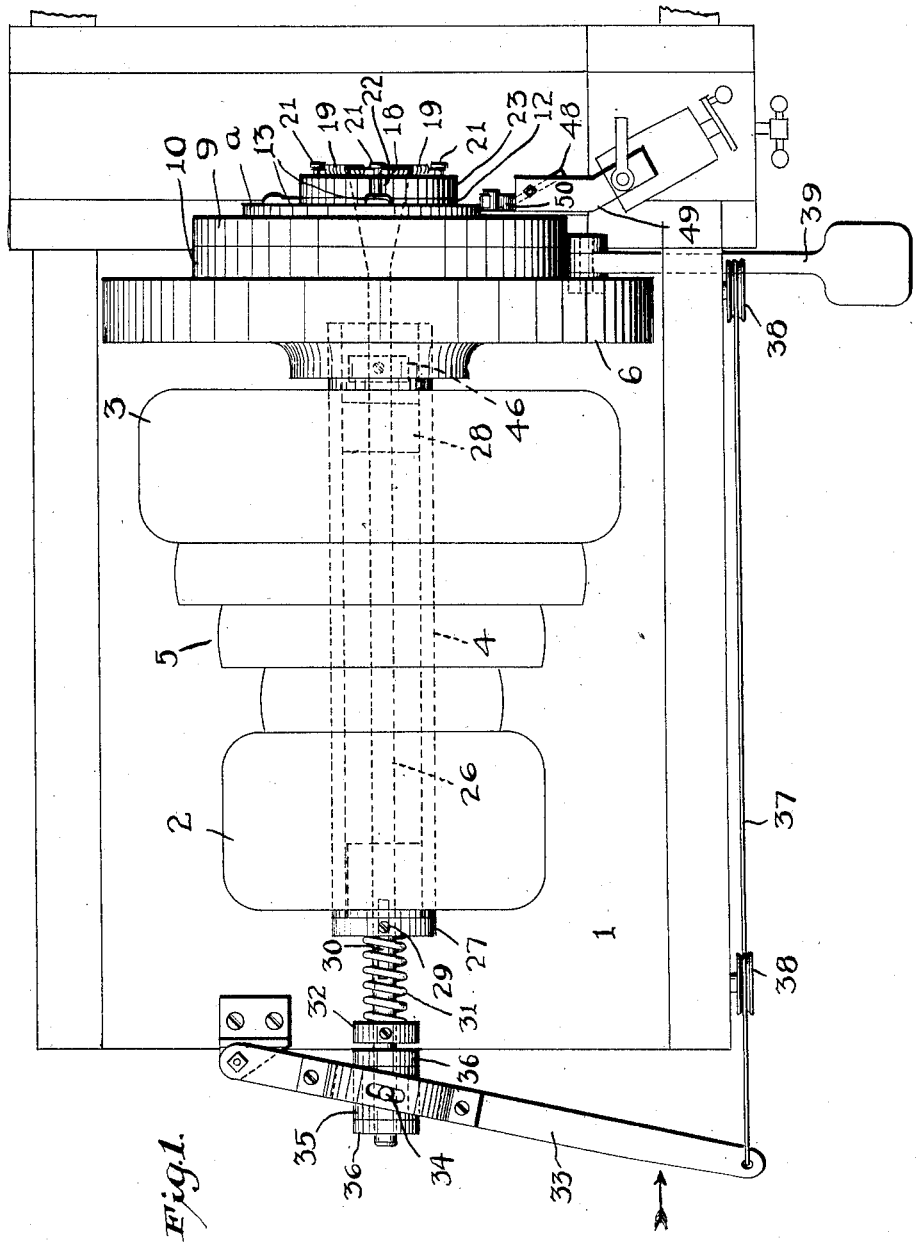

1 is a bed having bearings 2, 3 for a hollow rotary spindle 4, carrying stepped driving pulleys 5.

On the forward end of the spindle is screwed a circular head plate 6 having a central opening. To the head plate are removably secured by screws 7 and dowels 8 a die 9 and a spacer plate 10, the whole constituting operatively a rigid part. The spacer plate and die have central openings, which in the construction shown in Figs. 2, 3 and 6 are larger than the opening in the head plate. The die has a circular recess in its face affording a seat 11 for the ring $a$, the seat being less in depth than the ring, so that the ring when in place projects with a portion of its periphery or outer circumference continuously exposed. In this exposed external portion of the ring there is to be made a circumferential corner notch $n$, such as indicated for example in Fig. 10, where the cutter is seen making the cut. Rings thus notched possess certain advantages in use.

A quill 12, or cylindrical block having a central opening through it, is held in the opening of the spacer plate 10, so as to be capable of reciprocatory movement parallel with its axis. Said quill forms part of a multiple jaw mechanism, including three radially movable jaws 13 formed to bear upon the inner circumference and outer face of the ring. In the construction illustrated in Figs. 2, 3 and 6, the jaws comprise stems or shanks held and guided in radial slotted openings in the wall of the quill, wherein the shanks are kept from turning, and outer T-head portions 14, which latter are formed with transversely spaced bearing points 15 to contact with the interior of the ring, and a central bearing point 16 disposed to clamp the outer face of the ring without interfering with the cutter. In order to insure the spaced points 15 bearing simultaneously, the heads 14 are connected to the shanks 13 by hinge joints 17 permitting limited lateral flexibility.

The jaw mechanism is capable of expanding movement and rearward axial movement, to engage and hold the ring with true circularity in the die, and of the reverse movements for releasing the ring when the notch has been cut. A tapered member 18 is movable axially within the quill to produce the two movements of the jaws; and the construction is such that the jaws are first expanded and then forced rearward. As illustrated, the jaws are forced radially outward by the wedging action of the tapered member when moved longitudinally rearward, and are drawn inward to clear the outer face of the ring by springs 19, when permitted by forward movement of the tapered member. Compression springs 20, partly contained within rear chambers in the quill, are interposed between the same and the face of the head plate 6. The latter springs oppose yieldingly the rearward movement of the quill and jaws, and are of sufficient strength relative to the slope of the tapered member and the strength of the springs 19, so that the jaw mechanism is not forced rearward until the jaws have been expanded in contact with the interior of the ring and overlap its outer face. The relatively weak springs 19 may be advantageously disposed in triangular relation at the front of the quill, their ends connected to pins 21 projecting endwise from the jaw shanks 13 through radial slots 22 in a detachable end plate 23 on the quill.

The jaw mechanism is held against turning relatively to the head, that is to say, is coupled to the head so as to rotate therewith while being capable of sliding axially, by means of screw lugs 24 on the central region of the die engaging slots 25 in the quill 12.

The tapered member 18 is preferably a conical head or enlargement on the forward end of a central operating rod 26, the wide portion of the member being at the outer end and the narrow portion at the rear where it joins or continues with the rod. The operating rod extends longitudinally through and projects rearward from the hollow spindle 4, and is slidably guided in bushings 27, 28 fixed in its interior. A screw or key 29 in the rear bushing 27, projecting into a longitudinal slot 30 in the rod, couples the rod and tapered member to the spindle and head in respect to rotation, while permitting the rod and member to move longitudinally. Force is applied to the rod to move it in the rearward clamping direction by or through a spring, as the compression spring 31 interposed between the bushing 27 and a collar 32 fixed to the rod. Convenient operator's means for actuating the rod in connection with such spring comprises a lever 33 fulcrumed on the base and engaging pins 34 on a spool 35 confined between collars 36 on the rod, which turns within the spool, and a cable 37 passing by way of suitable direction-changing guides 38 to a pedal 39, depression of which carries the rod and tapered member forward. The spring 31 is strong enough, it will be understood to overcome the springs 19 and 20 and to press the ring outward and rearward against the support of the die with sufficient force to hold the ring rigidly in a circular condition while being cut.

When the tapered member is thrust forward as seen in Fig. 3, to release the ring, an automatic ejector is operated to eject the ring from the die. In the particular construction shown a suitable number of plungers 40 are reciprocable parallel with the axis of the ring in holes in the ring-seating region of the die, being normally urged rearward by springs 41 confined between the back of the die and heads 42 on the rear ends of the plungers. The rear portions of the plungers are accommodated in radial slots 43 in the spacer plate 10, so that dies having ring seats of different diameters can be used. The rear ends of the plungers are against the arms of a spider or skeleton ejector plate 44, which lies in a recess afforded by the central opening of the head plate 6 and slots 45 extending outward therefrom in the front face of the plate. The recess is deeper than the spider, which can thus move forward to project the plungers, the spider being normally held rearward by the springs 41. The spider has a central opening through which the rod 26 passes freely, and a collar 46 is secured to the rod in rear of the spider at such point that it will encounter and actuate the ejector in the forward movement of the rod and tapered member, after the jaws have been drawn inward far enough to clear the ring.

In the form of holding means for small rings illustrated in Figs. 4 and 5, the same head plate 6, rod 26, tapered operating member 18 and ejector 46, 44, 42, 41, 40 are employed. A spacer plate 10ª and a die 9ª having smaller interior openings are provided, and a quill 12ª of relatively small diameter is guided therein. The springs 20, in this instance, are sustained by a plate 47 secured to the back of the spacer plate. The jaws 13ª are comparatively narrow and may have slight lateral play in their slots in the quill, so that the joints 17 can be dispensed with. Each jaw is formed to bear against the interior curve of the ring at two points and to overlap the front face, as in the case of the jaws 13.

From the foregoing it will be understood that the rings are placed one at a time in the die when the jaw mechanism is held in the "open" condition by the pressure of the operator's foot on the pedal 39. The operator's device is then operated so that force is exerted rearwardly upon the rod 26 by the spring 31, causing the jaw mechanism to engage and clamp the ring in the die in the manner which has been described. When the cutting has been finished the operator's device is again actuated to advance the rod and tapered member, whereby the jaws are first drawn inward and then moved forward, and the collar 46 is caused to operate the ejector at the proper time. It will also be understood that the holding means may be variously modified.

The means for operating upon the ring, including an important method of preserving the edge of the notch, will now be described.

The cutting tool 48 in a holder 49 is mounted upon carriages movable by hand screws, after the manner familiar in lathes, so as to engage the projecting periphery of the rotating ring and be fed to cut a circular notch of the desired width, depth and contour. Because of the duty which the ring is to perform it is important that its outer curved surface be smooth and true and that the edge of the notch be continuous and uninterrupted. Under the action of the cutter, however, this edge, particularly when undercut as shown, tends to break or form a burr. To overcome this difficulty and to preserve the edge, and therefore the smooth periphery of the ring, I yieldingly support the metal. I employ a yielding pressure device bearing forcibly upon the peripheral surface at the region of cutting. Said device is represented by the spring blade 50 of Figs. 8 to 11. This blade is carried by the laterally spreading arms 51 of a blade-holder slide 52, which is movable longitudinally in a guide in the tool-holder 49, perpendicularly to the surface of the ring. Headed pins 53 on the slide, passing through longitudinally slotted openings 54 in the tool-holder, secure the slide to the face of said holder; and another pin 55 projects from the slide into a spring chamber 56, containing a spring 57, which yieldingly urges the slide forward.

The spring-blade is held near its ends, or at longitudinally remote points, in studs 58 on the arms 51, these studs being capable of turning on the blade-holder to accommodate the flexing movements of the blade. The blade is also capable of longitudinal movement in one or both of its holders 58, as the spring is bowed by being pressed at its central region against the curved surface of the ring. Preferably one end of the spring is fixed to the corresponding stud by a pin 59, while its other end is slotted, as at 60 to enable it to slip endwise on the pin 61 of the other stud. The rear edge 62 of the intermediate portion of the blade is offset outwardly from the ends, as seen in Fig. 11, so as to cause the blade to bear upon the periphery of the ring over and back from the peripheral edge being formed; and in the center of the blade is an opening 63 which permits the tool to project through the blade and enables the latter to bear upon the work close to the point of cutting. As the cutting proceeds the smooth hard surface of the flexible resilient blade, sustained by the further resilient pressure of the spring 57, supports the edge of the notch against breaking, and prevents the formation of any burr and burnishes the surface. The blade reinforces the strength of the metal adjacent to that being cut, by opposing the pressure of the cutting tool.

What I claim as new is:

1. A machine for circumferentially notching piston rings, comprising a rotary head, a die thereon having an internal seat adapted to receive and engage the outer circumference of the ring, multiple jaw mechanism co-operative with the inner circumference and outer face of the ring, and a cutting tool operative upon the periphery of the ring.

2. A machine for circumferentially notching piston rings, comprising a rotary head, a die thereon having an internal seat adapted to receive and engage the outer circumference of the ring, multiple jaw mechanism co-operative with the inner circumference and outer face of the ring, a cutting tool operative upon the periphery of the ring, and a flexible blade operative upon said periphery at the region of cutting.

3. A machine for circumferentially notching piston rings, comprising a rotary head, a die thereon having an internal seat adapted to receive and engage the outer circumference of the ring, multiple jaw mechanism co-operative with the inner circumference and outer face of the ring, a cutting tool operative upon the periphery of the ring and yielding means operative upon said periphery at the region of cutting.

4. The combination with means for holding and rotating a piston ring, of a tool adapted to cut a circumferential notch in the ring, and a yielding burnishing device adapted to act in conjunction with the cutting tool upon the peripheral edge of the notch.

5. The combination with means for holding and rotating a piston ring, of a tool adapted to cut a circumferential notch in the ring, and yielding means adapted to bear upon the periphery of the ring immediately adjacent to the cutting tool to produce an even edge.

6. The combination with means for holding and rotating a piston ring, of a tool adapted to cut a circumferential notch in the ring, and a flexible support adapted to bear upon the periphery of the ring to preserve the edge of the notch, the flexible support being constructed to accommodate the tool.

7. The combination with means for holding and rotating a piston ring, of a tool adapted to cut a circumferential notch in the ring, and a flexible blade arranged to bear upon the peripheral edge of the notch at the region of cutting.

8. The combination with means for holding and rotating a piston ring, of a tool adapted to cut a circumferential notch in the ring, and a flexible blade arranged to bear upon the peripheral edge of the notch at the region of cutting, said blade having an opening through which the tool projects.

9. The combination with means for holding and rotating a piston ring, of a tool adapted to cut a circumferential notch in the ring, a flexible blade arranged to bear upon the peripheral edge of the notch at the region of cutting, a holder for the blade mounted for yielding movement, and a spring means opposing the yielding of the blade holder.

10. The combination with means for holding and rotating a piston ring, of a tool-holder, a tool thereon adapted to cut a circumferential notch in the ring, a spring-pressed yielding blade-holder movable on the tool-holder, and a flexible blade on the blade-holder to bear upon the periphery of the ring at the region of cutting.

11. The combination with means for holding and rotating a piston ring, of a tool-holder, a tool thereon adapted to cut a circumferential notch in the ring, a spring-pressed yielding blade-holder movable on the tool-holder, and a flexible blade held at longitudinally spaced points on the blade-holder and arranged to bear at its intermediate portion upon the periphery of the ring at the region of cutting.

12. The combination with means for holding and rotating a piston ring, of a tool adapted to cut a circumferential notch in the ring, a flexible blade, and means holding said blade at longitudinally spaced points and causing its intermediate portion to bear upon the periphery of the ring at the region of cutting.

13. The combination with means for holding and rotating a piston ring, of a tool adapted to cut a circumferential notch in the ring, a flexible blade adapted to be bowed in pressure contact with the periphery of the ring at the region of cutting, and means for holding the blade at opposite sides of the cutting region, in such manner that the blade has longitudinal play.

14. The combination with means for holding and rotating a piston ring, of a tool adapted to cut a circumferential notch in the ring, a flexible blade adapted to be bowed in pressure contact with the periphery of the ring at the region of cutting, and pivotal supports holding the blade at opposite sides of its contacting portion, the blade being free longitudinally with respect to one of its supports.

15. The combination with means for holding and rotating a piston ring, and a tool adapted to cut a circumferential notch in the ring, of means for acting upon the periphery of the ring at the region of cutting, comprising a spring-pressed yieldingly movable blade-holder, spaced turning supports on the blade-holder, and a flexible blade held in said turning supports at opposite sides of its contacting portion and free for longitudinal movement.

16. The method of circumferentially notching a piston ring, which consists in producing a relative rotation between the ring and the cutting tool while the cutting edge of the tool is in engagement with the metal of the ring and applying a yielding pressure to the metal adjacent to the notch, thus supporting it against the pressure of the cutting tool.

17. The process of circumferentially notching a piston ring, which consists in rotating the ring, feeding the cutting edge of a tool against the ring, and simultaneously and yieldingly supporting the metal adjacent to the notch against the pressure of the cutting tool, so as to prevent the formation of a burr, at the same time burnishing the surface.

In testimony whereof, I have signed my name to this specification, in the presence of the subscribing witness.

ROBT. B. WASSON.

Witness:
LOUELLA F. LITTLE.